United States Patent
Ge (10) Patent No.: US 9,205,998 B2
(45) Date of Patent: Dec. 8, 2015

(54) FEEDING DEVICE

(71) Applicants: FU DING ELECTRONICAL TECHNOLOGY (JIASHAN) CO.,LTD., Zhejiang (CN); HON HAI PRECISION INDUSTRY CO., LTD., New Taipei (TW)

(72) Inventor: Hong-Tao Ge, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/472,788

(22) Filed: Aug. 29, 2014

(65) Prior Publication Data
US 2015/0060237 A1 Mar. 5, 2015

(30) Foreign Application Priority Data
Aug. 30, 2013 (CN) .................. 2013 2 5345409 U (51) Int. Cl.
*B65G 47/90* (2006.01)

(52) U.S. Cl.
CPC ............ *B65G 47/901* (2013.01); *B65G 47/907* (2013.01)

(58) Field of Classification Search
CPC ............................ B65G 47/901; B65G 47/907
See application file for complete search history.

(56) References Cited

U.S. PATENT DOCUMENTS

| | | | | |
|---|---|---|---|---|
| 3,966,058 | A | * | 6/1976 | Heffron et al. ............. 198/346.2 |
| 4,343,590 | A | * | 8/1982 | D'Aloisio .................. 414/746.8 |
| 4,573,862 | A | * | 3/1986 | Anderson ................ 198/750.11 |
| 4,975,018 | A | * | 12/1990 | Langenbacher et al. . 198/750.11 |
| 5,215,181 | A | * | 6/1993 | Blatt .......................... 198/468.2 |
| 5,520,502 | A | * | 5/1996 | Liljengren et al. ......... 414/751.1 |
| 5,549,442 | A | * | 8/1996 | Crorey ....................... 414/751.1 |
| 7,740,122 | B2 | * | 6/2010 | Usui .......................... 198/346.3 |
| 8,789,679 | B2 | * | 7/2014 | Lu et al. ..................... 198/345.3 |
| 9,017,009 | B2 | * | 4/2015 | Geith ............................ 414/800 |
| 2002/0192067 | A1 | * | 12/2002 | Prodel et al. .................. 414/799 |
| 2010/0215470 | A1 | * | 8/2010 | Bao et al. ................... 414/749.6 |
| 2014/0178168 | A1 | * | 6/2014 | Wang .......................... 414/749.6 |

* cited by examiner

*Primary Examiner* — Gene Crawford
*Assistant Examiner* — Thomas Randazzo
(74) *Attorney, Agent, or Firm* — Novak Druce Connolly Bove + Quigg LLP (57) ABSTRACT

A feeding device includes a guiding assembly and a clamping mechanism. The guiding assembly includes a guiding rod and a transfer rod coupled to the guiding rod. The transfer rod includes a rack. The clamping mechanism includes a driving assembly and a clamping assembly. The driving assembly includes a support frame, a first driver coupled to the support frame, a gear coupled to the first driver and meshing with the rack, and two guiding members adjustably coupled to the support frame and positioned at opposite sides of the guiding rod. The guiding members is latched to the guiding rod and configured to move the support frame to adjust a backlash between the gear and the rack. The clamping assembly is coupled to the support frame.

20 Claims, 6 Drawing Sheets

FEEDING DEVICE

FIELD

The subject matter herein generally relates to feeding devices, and particularly to an automatic feeding device.

BACKGROUND

When a workpiece is machined or assembled, a feeding device can be used to transfer the workpiece. The feeding device can include a driver and a clamping member coupled to the driver. The driver can drive the clamping member to clamp the workpiece and then transfer the workpiece.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is in relation to a feeding device that can include a guiding assembly and a clamping mechanism. The guiding assembly can include a mounting plate, a guiding rod coupled to the mounting plate, and a transfer rod coupled to the guiding rod. The guiding rod can include at least one limiting protrusion. The transfer rod can include a rack. The clamping mechanism can include a driving assembly and a clamping assembly. The driving assembly can include a support frame, a first driver coupled to the support frame, a gear coupled to the first driver and meshing with the rack, and at least one guiding member adjustably coupled to the support frame and latched to the at least one limiting protrusion. The at least one guiding member can be configured to move the support frame to adjust a backlash between the gear and the rack. The clamping assembly can be coupled to the support frame.

The present disclosure is further in relation to a feeding device that can include a guiding assembly and a clamping mechanism. The guiding assembly can include a guiding rod and a transfer rod coupled to the guiding rod. The transfer rod can include a rack. The clamping mechanism can include a driving assembly and a clamping assembly. The driving assembly can include a support frame, a first driver coupled to the support frame, a gear coupled to the first driver and meshing with the rack, and at least one guiding member adjustably coupled to the support frame and latched to the guiding rod. The at least one guiding member can be configured to move the support frame to adjust a backlash between the gear and the rack. The clamping assembly can be coupled to the support frame.

The present disclosure is further in relation to a feeding device that can include a guiding assembly and a clamping mechanism. The guiding assembly can include a guiding rod and a transfer rod coupled to the guiding rod. The transfer rod can include a rack. The clamping mechanism can include a driving assembly and a clamping assembly. The driving assembly can include a support frame, a first driver coupled to the support frame, a gear coupled to the first driver and meshing with the rack, and two guiding members adjustably coupled to the support frame and positioned at opposite sides of the guiding rod. The guiding members can be latched to the guiding rod and configured to move the support frame to adjust a backlash between the gear and the rack. The clamping assembly can be coupled to the support frame.

Figure 1:
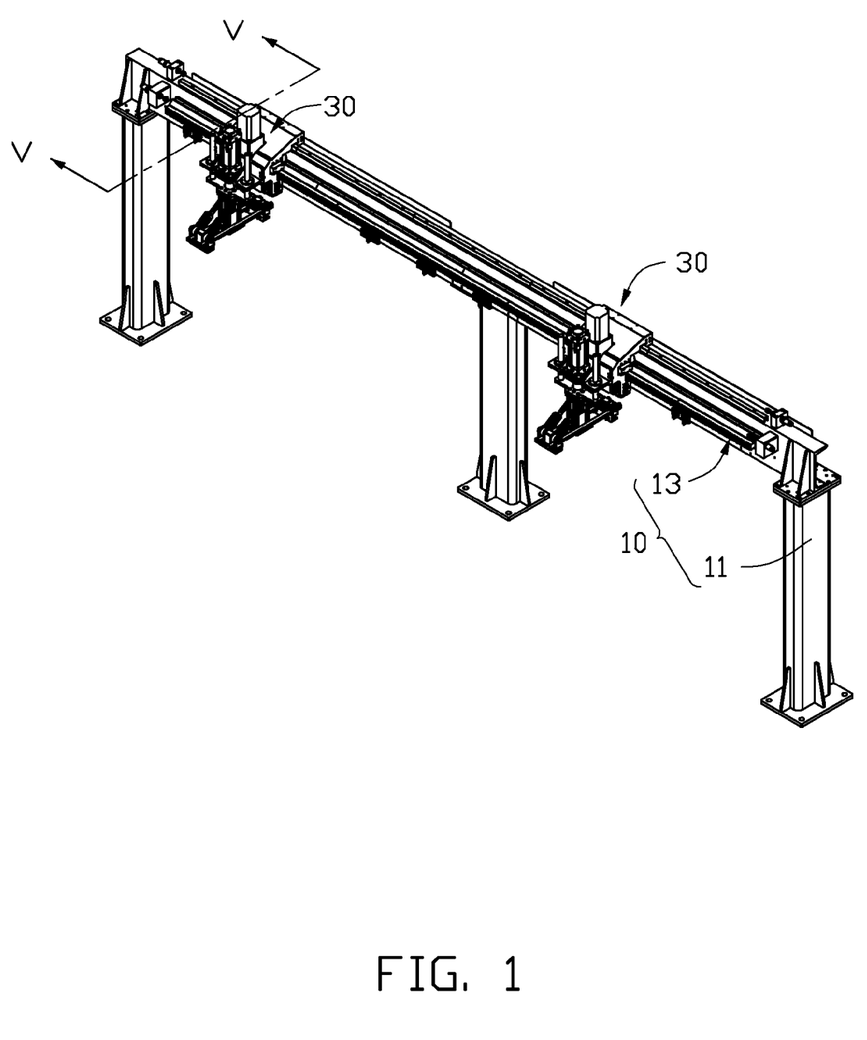
FIG. 1 is an isometric view of an embodiment of a feeding device including a guiding mechanism and a clamping mechanism.

FIG. 1 illustrates an embodiment of a feeding device 100. The feeding device 100 can be configured to clamp a workpiece (not shown) and transfer the workpiece to a conveyor (not shown) positioned below the feeding device 100. The feeding device 100 can include a guiding mechanism 10 and two clamping mechanisms 30. The guiding mechanism 10 can across the conveyor. The clamping mechanisms 30 can be movably coupled to the guiding mechanism 10 and both configured to clamp and transfer the workpiece.

Figure 2:
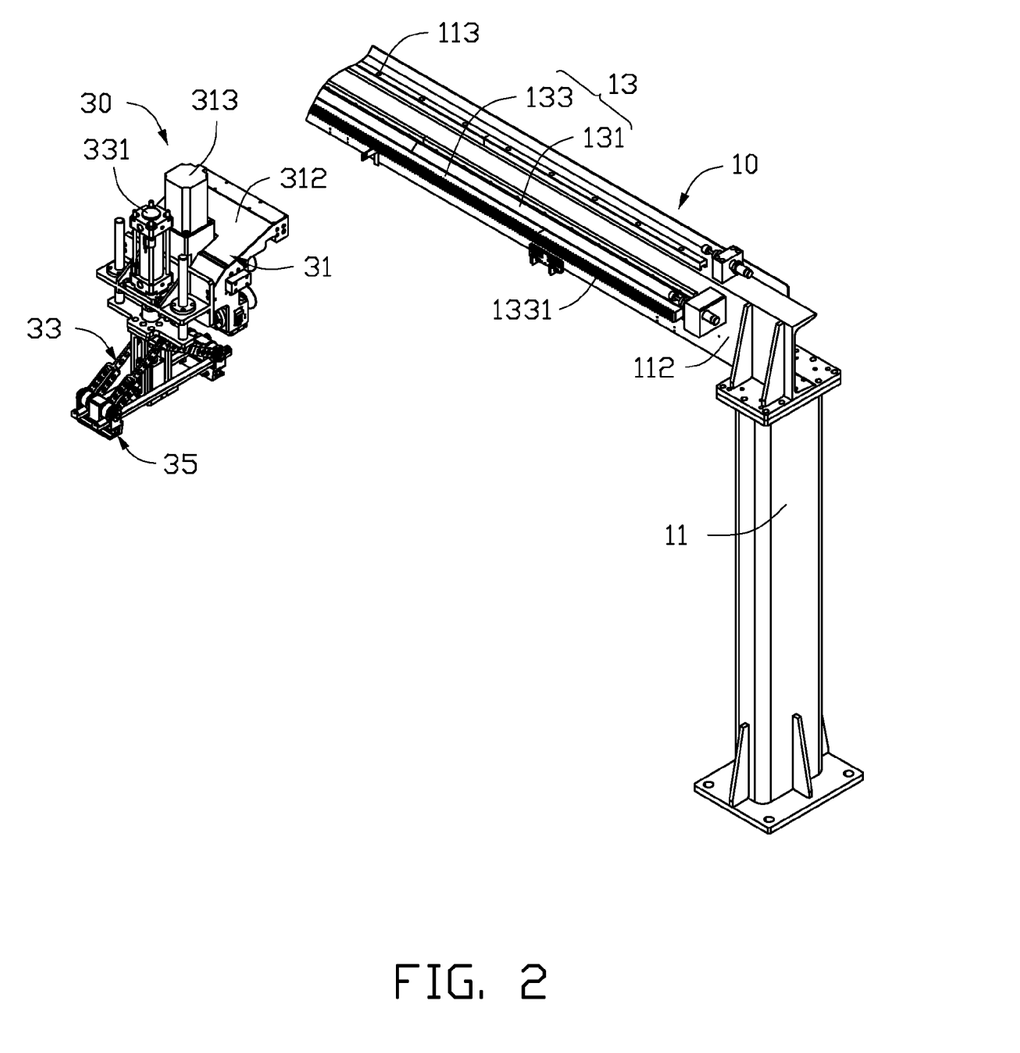
FIG. 2 is a partially disassembled, isometric view of the guiding mechanism and the clamping mechanism of the feeding device of FIG. 1.

FIG. 2 illustrates that the guiding mechanism 10 can include a fixing frame 11 and a guiding assembly 13 fixed to the fixing frame 11. The fixing frame 11 can be substantially U-shaped and include a mounting plate 112 and a guiding protrusion 113 protruding out from the mounting plate 112. The mounting plate 112 can be substantially a rectangular plate. The guiding assembly 13 can be mounted on the mounting plate 112 and include a guiding rod 131 and a transfer rod 133 fixed to the guiding rod 131.

Figure 5:
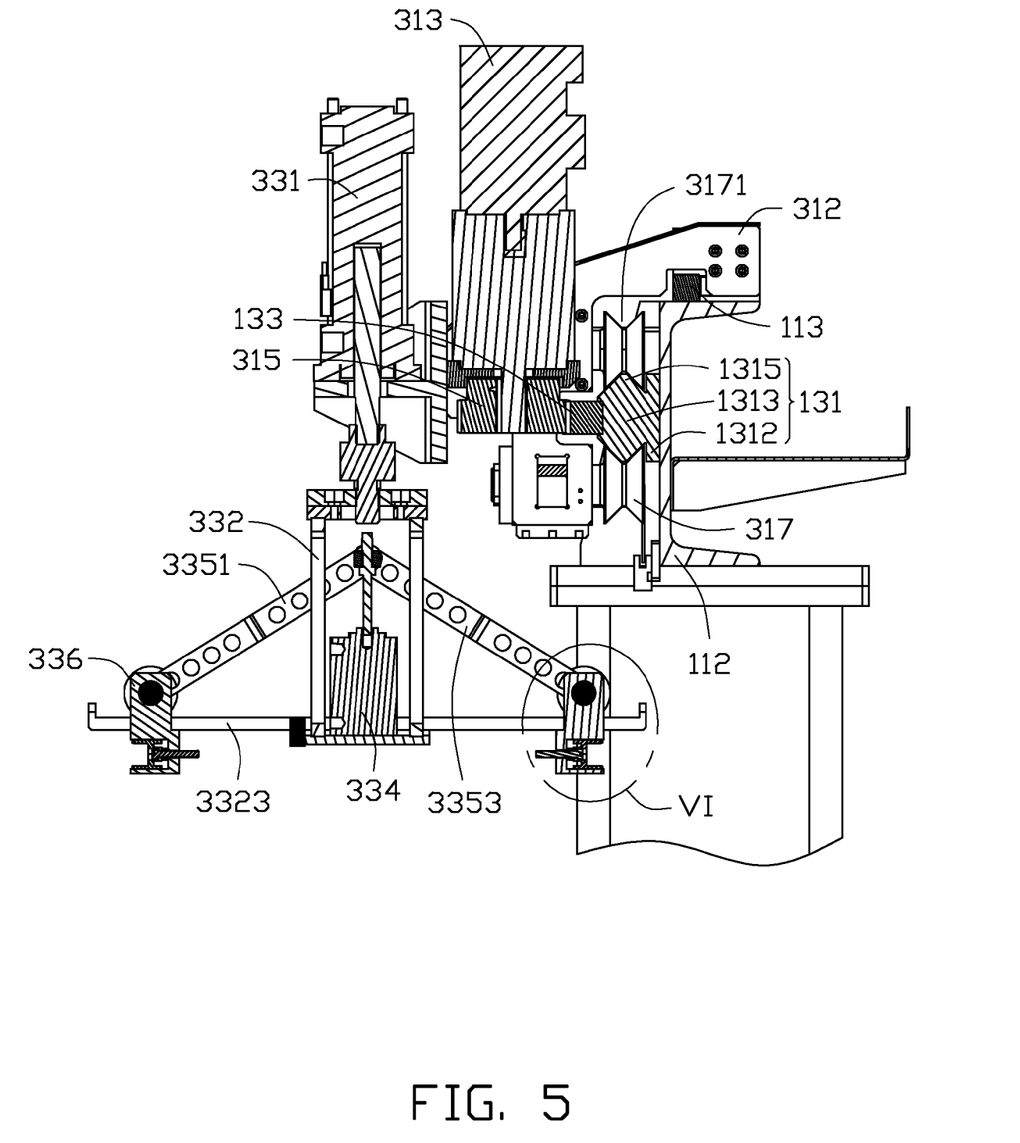
FIG. 5 is a cross-sectional view of the feeding device of FIG. 1, taken alone line V-V.

FIG. 5 illustrates that the guiding rod 131 can include a fixing portion 1312, a guiding portion 1313, and a pair of limiting protrusions 1315. The fixing portion 1312 can be substantially positioned in a vertical direction. The guiding portion 1313 can protrude out from a side surface of the fixing portion 1312 and substantially perpendicular to the fixing portion 1312. The limiting protrusions 1315 can respectively protrude out from opposite sides of the guiding portion 1313. One of the limiting protrusions 1315 can be located above the guiding portion 1313 and another one can be located below the guiding portion 1313. The fixing portion 1312 can be fixed to the mounting plate 112. The guiding portion 1313 can be a substantially rectangular plate. Each limiting protrusion 1315 can be substantially V-shaped. The transfer rod 133 can be substantially in a shape of a bar and include a rack 1331 (shown in FIG. 2) positioned at a side of the transfer rod 133 away from the guiding portion 1313.

Figure 3:
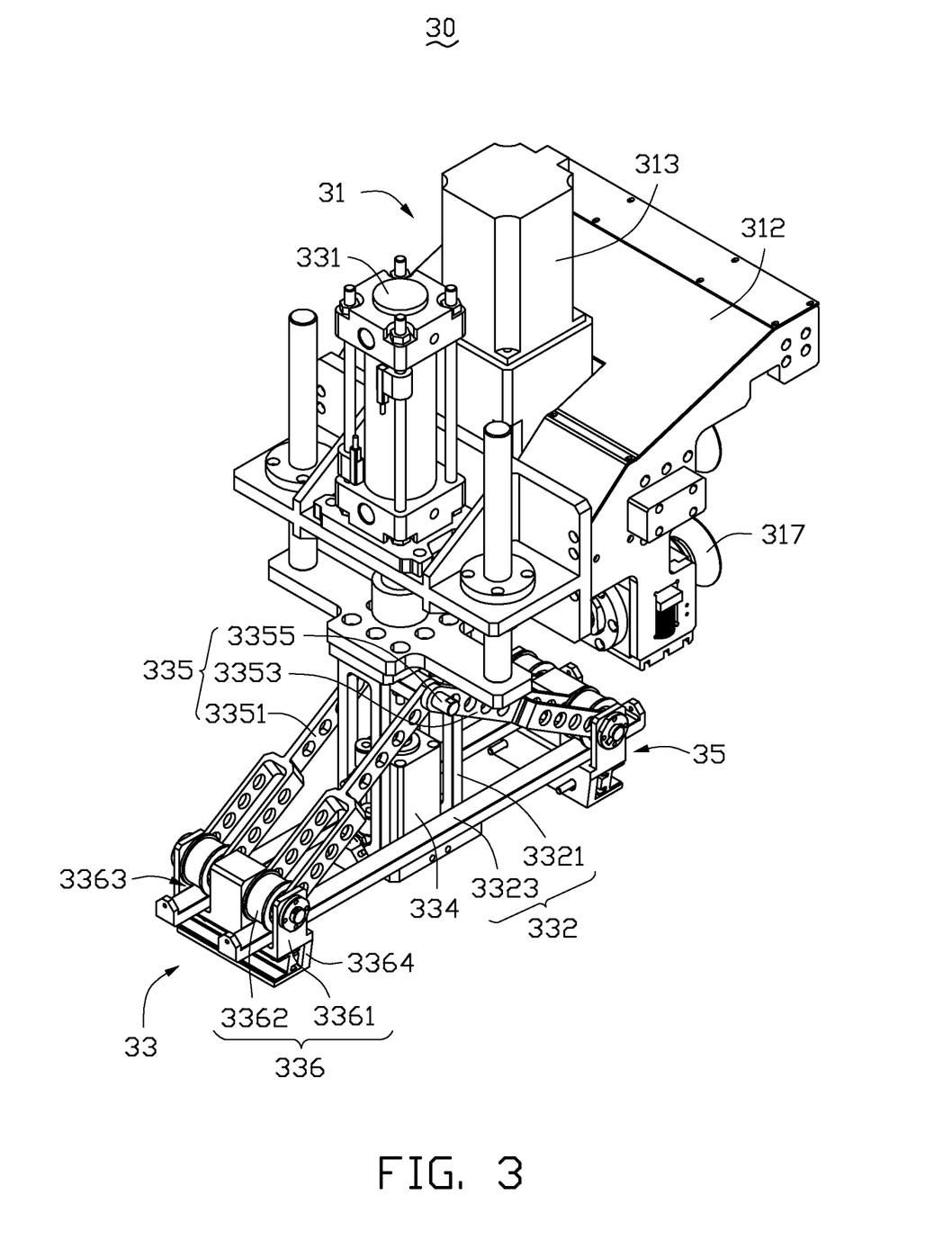
FIG. 3 is an enlarged, isometric view of the clamping mechanism of the feeding device of FIG. 2.
Figure 4:
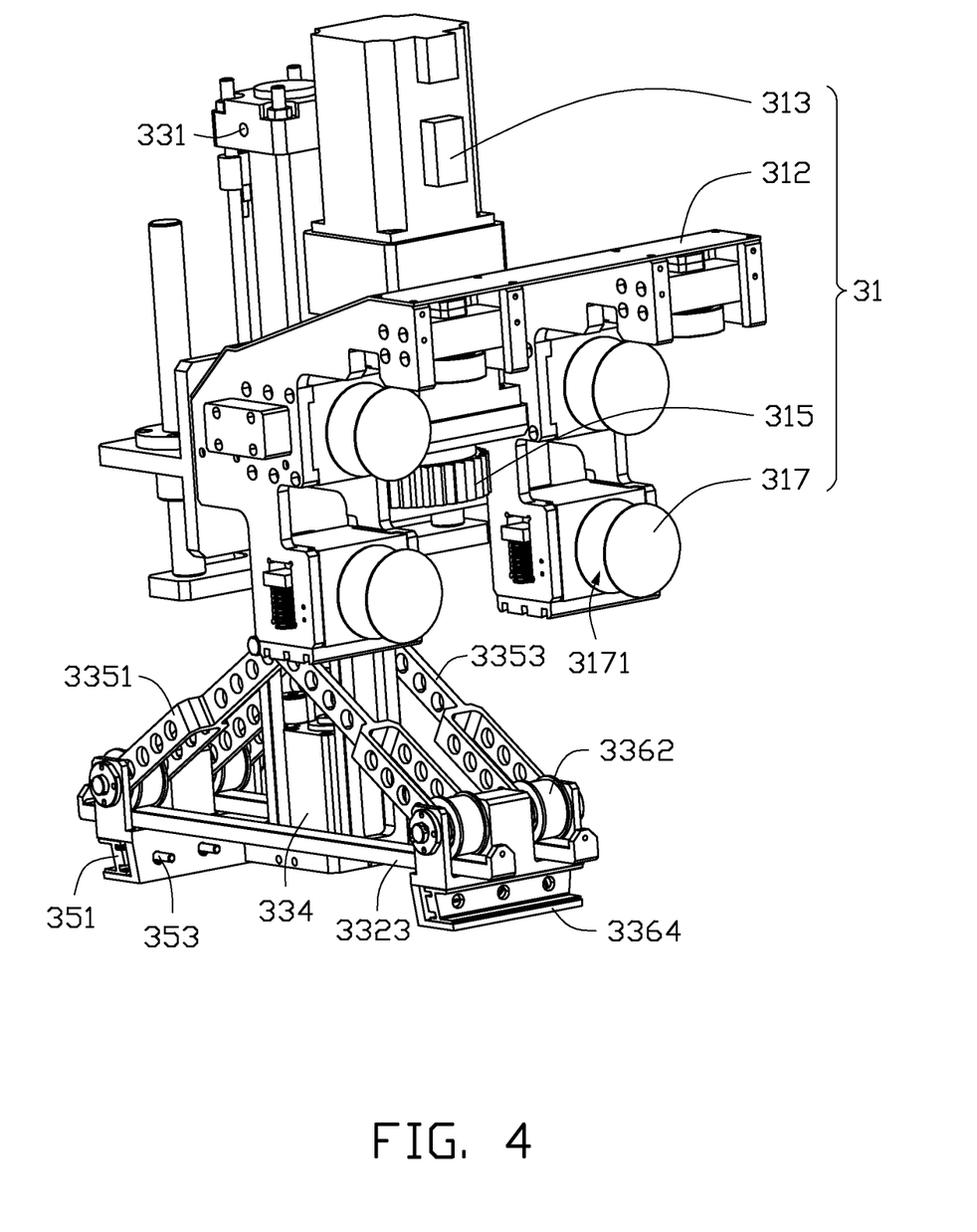
FIG. 4 is similar to FIG. 3 but viewed in another angle.

FIGS. 3 and 4 illustrate that each clamping mechanism 30 can include a driving assembly 31, a clamping assembly 33, and two buffering assemblies 35. The driving assembly 31 can include a support frame 312, a first driver 313, a gear 315, and four guiding members 317. The support frame 312 can be movably coupled to the guiding protrusions 113 of the fixing frame 11. The first driver 313 can be coupled to the support frame 312. The gear 315 can be coupled to the first driver 313 and mesh with the rack 1331. Thus, the first driver 313 can be configured to move the gear 315 along the rack 1331, to enable the clamping mechanism 30 to move relative to the guiding mechanism 10.

In the illustrated embodiment, a protruding direction of each limiting protrusion 1315 from the guiding portion 1313 can be parallel to a rotation axis of the gear 315. The guiding members 317 can be adjustably mounted on the support frame 312 and positioned at four corners of an imaginary quadrangle. Two of the guiding members 317 can be positioned above the limiting protrusions 1315 and another two of the guiding members 317 can be positioned below the limiting protrusions 1315. Each guiding member 317 can define a limiting groove 3171 corresponding to the limiting protrusions 1315. The limiting groove 3171 can be substantially in a shape of a ring and a cross-section thereof can be substantially V-shaped. One of the limiting protrusions 1315 can be received in corresponding two of the guiding members 317. Another one of the limiting protrusions 1315 can be received in another two of the guiding members 317. Thus, the guiding members 317 can support the guiding rod 131. The guiding members 317 can be configured to adjust a distance between the support frame 312 and the guiding rod 131 to adjust a backlash between the gear 315 and the rack 1331. In at least one embodiment, the guiding members 317 can be threaded with the support frame 312 to move the support frame 312.

The clamping assembly 33 can be mounted on the support frame 312 and include a second driver 331, a bracket 332, a third driver 334, a linkage assembly 335, and two clamping members 336. The second driver 331 can be mounted on the support frame 312 and positioned at a side of the support frame 312 away from the rack 1331. The bracket 332 can be coupled to the second driver 331 and include a support frame 3321 and two guiding rails 3323. The support frame 3321 can be substantially in a shape of a hollow cuboid and coupled to the second driver 331. Thus, the second driver 331 can move the bracket 332 upward and downward relative to the guiding mechanism 10.

The guiding rails 3323 can be respectively coupled to the support frame 3321 and positioned at an end of the support frame 3321 away from the second driver 331. The guiding rails 3323 can be substantially perpendicular to the support frame 3321 and parallel to each other. The third driver 334 can be mounted on the guiding rails 3323 of the bracket 332 and coupled to the linkage assembly 335. The third driver 334 can be received in the support frame 3321. The linkage assembly 335 can include two first rods 3351, two second rods 3353, and a coupling shaft 3355.

Each first rod 3351 and the corresponding second rod 3353 can be pivoted together by the coupling shaft 3355. Each first rod 3351 and the corresponding second rod 3353 can be further respectively pivoted to the corresponding clamping member 336. In the illustrated embodiment, a first end portion of the first rod 3351 can be pivoted to the corresponding second rod 3353, and a second end portion can be pivoted to the corresponding clamping member 336. A first end portion of the second rod 3353 can be pivoted to the corresponding first rod 3351, and a second end portion can be pivoted to the corresponding clamping member 336. The first rods 3351 can be parallel to each other and positioned opposite sides of the third driver 334. The second rods 3351 can be parallel to each other and positioned opposite sides of the third driver 334.

The coupling shaft 3355 can be coupled to the third driver 334. The third driver 334 can be configured to move the coupling shaft 3355 upward and downward to fold or unfold the first rods 3351 and the second rods 3353. Thus, the second end portion of each first rod 3351 and the second end portion of the corresponding second rod 3353 can move close to or away from each other. The clamping members 336 can be movably coupled to the guiding rails 3323 of the bracket 332 and respectively pivoted to the first rods 3351 and the second rods 3353. Each clamping member 336 can include a clamping portion 3361 and two rotatable wheels 3362 rotatably coupled to the clamping portion 3361. The clamping portion 3361 can define two grooves 3363 at a top surface thereof and configured to receive the rotatable wheels 3362. The clamping portion 3361 can further define a receiving groove 3364 at a side surface face to another clamping portion 3361. A first end portion of each guiding rail 3323 can be received in corresponding groove 3363 of one clamping member 336. A second end portion of the guiding rail 3323 can be received in corresponding groove 3363 of another clamping member 336.

The rotatable wheels 3362 can be respectively received in the corresponding groove 3363 and positioned above the corresponding guiding rail 3323. Each rotatable wheel 3362 can abut against the corresponding guiding rail 3323 and pivoted to the second portion of the corresponding first rods 3351 or second rods 3353. When the second end portion of the first rod 3351 and the second end portion of the second rod 3353 move close to or away from each other, the rotatable wheel 3362 can rotate and slide along the guiding rail 3323. Thus, the clamping members 336 can move close to or away from each other to clamp or release the workpiece.

Figure 6:
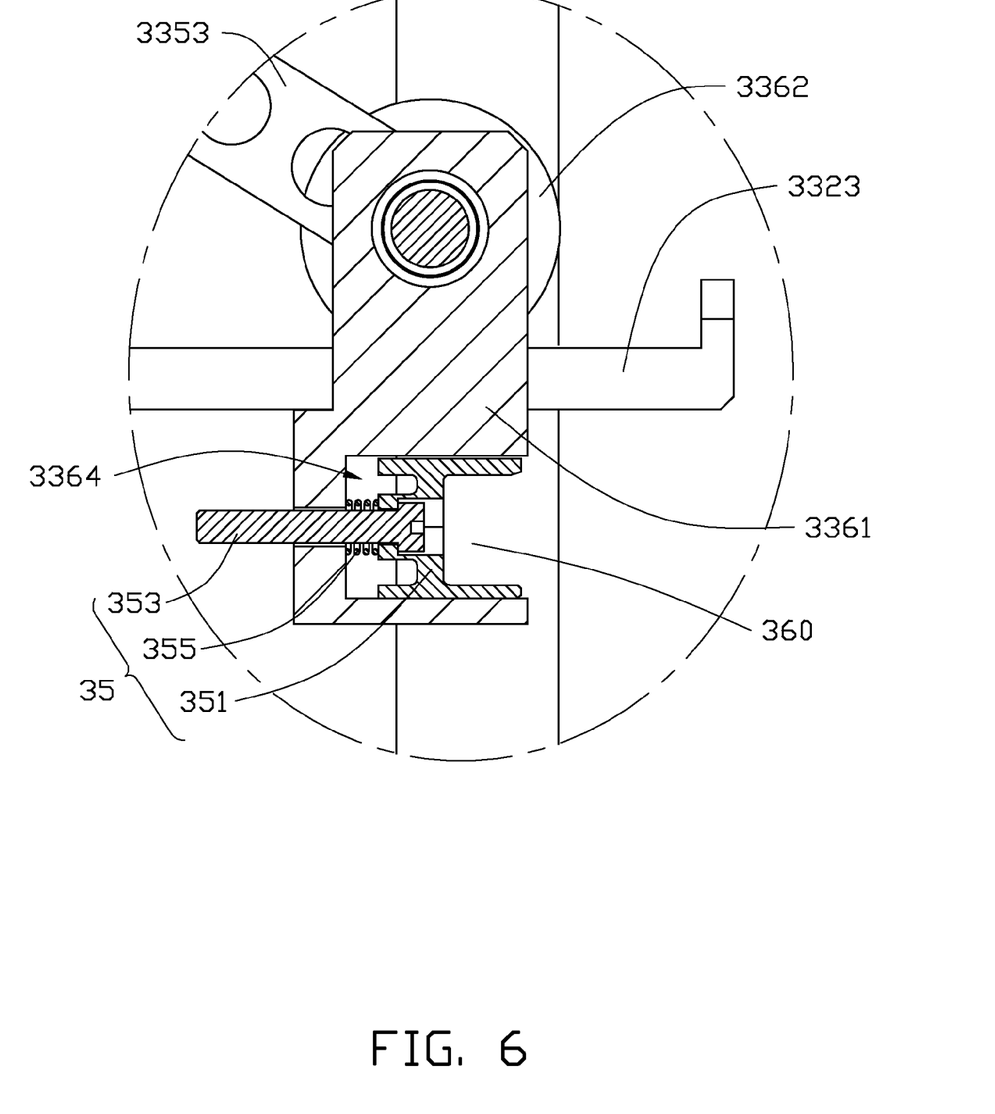
FIG. 6 is an enlarged view of circle VI of FIG. 5.

FIG. 5 and FIG. 6 illustrate that the buffering assemblies 35 can be respectively received in the receiving grooves 3364 of the clamping members 336. Each buffering assembly 35 can include a movable member 351, a guiding rod 353, and an elastic member 355. The movable member 351 can be movably received in the corresponding receiving groove 3364. The movable member 351 can define a clamping groove 360. The guiding rod 353 can be fixedly coupled to the movable member 351 and movably inserted through the corresponding clamping portion 3361. An end portion of the guiding rod 353 away from the movable member 351 can protrude from the clamping portion 3361. The elastic member 355 can be sleeved on the guiding rod 353 and positioned between the clamping portion 3361 and the movable member 351. A first end portion of the elastic member 355 can elastically resist against a side surface of the clamping portion 3361 received in the receiving groove 3364. A second end portion of the elastic member 355 can elastically resist against the movable member 351. When the clamping portions 3361 clamps a workpiece, the workpiece can be partly received in the clamping grooves 360 of the movable members 351. The movable members 351 of the buffering assemblies 35 can elastically contact the workpiece, to avoid the workpiece to be damaged. When the workpiece is released, the guiding rod 353, the movable member 351, and the elastic member 355 can be recovered back.

In assembly, the support frame 312 can be movably mounted on the guiding protrusion 113 of the mounting plate 112. The limiting protrusions 1315 can be respectively received in the corresponding limiting grooves 3171 of the guiding members 317. The clamping assemblies 33 can be mounted on the support frame 312.

In use, the second driver 331 can drive the clamping assemblies 33 to move downwardly relative to the guiding mechanism 10. The third driver 334 can move the first rods 3351 and the corresponding second rods 3353 towards each other. The rotatable wheels 3362 can rotate relative to the guiding rails 3323. The clamping assemblies 33 can move towards each other to clamp the workpiece. Then, the second driver 331 can move the clamping assemblies 33 upward. The first driver 313 can rotate the gear 315 to move the gear 315 along the rack 1331. The guiding members 317 can move along the limiting protrusions 1315 and the support frame 312 can move along the guiding protrusion 113. When the workpiece is transferred to a predetermined position, the second driver 334 can move the first rods 3351 and the corresponding second rods 3353 away from each other. The rotatable wheels 3362 can move along the guiding rails 3323 away from each other. The clamping assemblies 3361 can release the workpiece.

In at least one embodiment, the buffering assemblies 35 can be omitted, and then the clamping portions 3361 can directly clamp the workpiece. A number of each of the guiding rails 3323, the first rods 3351, the second rods 3353, the grooves 3363, the clamping mechanisms 30, and the rotatable wheels 3362 can be one or more than two. The guiding protrusion 113 can be omitted, and then guiding rod 131 support the support frame 312.

The embodiments shown and described above are only examples. Many details are often found in the art such as the other features of a feeding device. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A feeding device comprising:
   a guiding assembly comprising:
      a guiding rod; and
      a transfer rod coupled to the guiding rod and comprising a rack; and
   a clamping mechanism comprising:
      a driving assembly comprising:
         a support frame;
         a first driver coupled to the support frame;
         a gear coupled to the first driver and meshing with the rack; and
         two guiding members adjustably coupled to the support frame and positioned at opposite sides of the guiding rod, the guiding members latched to the guiding rod and configured to move the support frame to adjust a backlash between the gear and the rack, and
      a clamping assembly coupled to the support frame.

2. A feeding device comprising:
   a guiding mechanism comprising:
      a mounting plate,
      a guiding rod coupled to the mounting plate, the guiding rod comprising at least one limiting protrusion, and
      a transfer rod coupled to the guiding rod and comprising a rack; and
   a clamping mechanism comprising:
      a driving assembly comprising:
         a support frame;
         a first driver coupled to the support frame;
         a gear coupled to the first driver and meshing with the rack; and
         at least one guiding member adjustably coupled to the support frame and latched to the at least one limiting protrusion, the at least one guiding member configured to move the support frame to adjust a backlash between the gear and the rack, and
      a clamping assembly coupled to the support frame.

3. The feeding device of claim 2, wherein the at least one guiding member defines a limiting groove corresponding to the at least one limiting protrusion, the at least one limiting protrusion is received in the limiting groove.

4. The feeding device of claim 3, wherein the limiting groove is substantially in a shape of a ring and a cross-section thereof is substantially V-shaped, the at least one limiting protrusion is substantially V-shaped corresponding to the limiting groove.

5. The feeding device of claim 2, wherein a protruding direction of the at least one limiting protrusion is parallel to a rotation axis of the gear.

6. The feeding device of claim 2, wherein the clamping assembly comprises:
   a second driver coupled to the support frame,
   a bracket coupled to the second driver and configured to move upward and downward driven by the second driver,
   a third driver coupled to the bracket,
   a linkage assembly coupled to the third driver, and
   two clamping members respectively coupled to the bracket and pivoted to the linkage assembly, wherein the third driver is configured to move the clamping members toward or away from each other.

7. The feeding device of claim 6, wherein the bracket comprises:
   a support frame coupled to the second driver, and
   at least one guiding rail coupled to the support frame of the bracket and substantially perpendicular to the support frame of the bracket,
   wherein the third driver is coupled to the at least one guiding rail and received in the support frame, each clamping member comprises a clamping portion and at least one rotatable wheel rotatably coupled to the clamping portion, the at least one guiding rail is movably inserted into the clamping portion, the at least one rotatable wheel abuts against the at least one guiding rail and pivoted to the linkage assembly, the at least one rotatable wheel is configured to move along the at least one guiding rail driven by the third driver.

8. The feeding device of claim 7, wherein the linkage assembly comprises:
   a first rod, a second rod, and
a coupling shaft coupled to the third driver,
wherein a first end portion of the first rod is pivoted to the second rod by the coupling shaft, and a second end portion of the first rod is pivoted to the at least one rotatable wheel of the corresponding clamping member; a first end portion of the second rod is pivoted to the first rod by the coupling shaft, and a second end portion of the second rod is pivoted to the at least one rotatable wheel of the corresponding clamping member.

9. The feeding device of claim 6, wherein the clamping portion defines at least one groove at a top surface thereof and configured to receive the at least one rotatable wheel, a first end portion of the at least one guiding rail is received in the corresponding at least one groove of one clamping member, a second end portion of the at least one guiding rail is received in the corresponding at least one groove of another clamping member.

10. The feeding device of claim 9, wherein each clamping portion defines a receiving groove at a side surface face to another clamping portion, the clamping mechanism further comprises two buffering assemblies respectively received in the corresponding receiving groove, each buffering assembly comprises:
a movable member movably received in the corresponding receiving groove,
a guiding rod coupled to the movable member movably inserted through the corresponding clamping portion, and
an elastic member sleeved on the guiding rod and positioned between the corresponding clamping portion and the movable member.

11. The feeding device of claim 10, wherein a first end portion of the elastic member elastically resists against the corresponding clamping portion, a second end portion of the elastic member elastically resists against the movable member.

12. The feeding device of claim 10, wherein the movable member defines a clamping groove.

13. A feeding device comprising:
a guiding assembly comprising:
a guiding rod; and
a transfer rod coupled to the guiding rod and comprising a rack; and
a clamping mechanism comprising:
a driving assembly comprising:
a support frame;
a first driver coupled to the support frame;
a gear coupled to the first driver and meshing with the rack; and
at least one guiding member adjustably coupled to the support frame and latched to the guiding rod, the at least one guiding member configured to move the support frame to adjust a backlash between the gear and the rack, and
a clamping assembly coupled to the support frame.

14. The feeding device of claim 13, wherein the guiding rod comprises at least one limiting protrusion, the at least one guiding member defines a limiting groove corresponding to the at least one limiting protrusion, the at least one limiting protrusion is received in the limiting groove.

15. The feeding device of claim 13, wherein the clamping assembly comprises:
a second driver coupled to the support frame,
a bracket coupled to the second driver and configured to move upward and downward driven by the second driver,
a third driver coupled to the bracket,
a linkage assembly coupled to the third driver, and
two clamping members respectively coupled to the bracket and pivoted to the linkage assembly, wherein the third driver is configured to move the clamping members toward or away from each other.

16. The feeding device of claim 15, wherein the bracket comprises:
a support frame coupled to the second driver, and
at least one guiding rail coupled to the support frame of the bracket and substantially perpendicular to the support frame of the bracket,
wherein the third driver is coupled to the at least one guiding rail and received in the support frame, each clamping member comprises a clamping portion and at least one rotatable wheel rotatably coupled to the clamping portion, the at least one guiding rail is movably inserted into the clamping portion, the at least one rotatable wheel abuts against the at least one guiding rail and pivoted to the linkage assembly, the at least one rotatable wheel is configured to move along the at least one guiding rail driven by the third driver.

17. The feeding device of claim 16, wherein the linkage assembly comprises:
a first rod,
a second rod, and
a coupling shaft coupled to the third driver,
wherein a first end portion of the first rod is pivoted to the second rod by the coupling shaft, and a second end portion of the first rod is pivoted to the at least one rotatable wheel of the corresponding clamping member; a first end portion of the second rod is pivoted to the first rod by the coupling shaft, and a second end portion of the second rod is pivoted to the at least one rotatable wheel of the corresponding clamping member.

18. The feeding device of claim 16, wherein the clamping portion defines at least one groove at a top surface thereof and configured to receive the at least one rotatable wheel, a first end portion of the at least one guiding rail is received in the corresponding at least one groove of one clamping member, a second end portion of the at least one guiding rail is received in the corresponding at least one groove of another clamping member.

19. The feeding device of claim 18, wherein each clamping portion defines a receiving groove at a side surface face to another clamping portion, the clamping mechanism further comprises two buffering assemblies respectively received in the corresponding receiving groove, each buffering assembly comprises:
a movable member movably received in the corresponding receiving groove,
a guiding rod coupled to the movable member movably inserted through the corresponding clamping portion, and
an elastic member sleeved on the guiding rod and positioned between the corresponding clamping portion and the movable member.

20. The feeding device of claim 19, wherein a first end portion of the elastic member elastically resists against the corresponding clamping portion, a second end portion of the elastic member elastically resists against the movable member.

* * * * *